United States Patent [19]

Rushmore

[11] 4,237,288
[45] Dec. 2, 1980

[54] DECAFFEINATION OF FATTY MATERIALS

[75] Inventor: Dean F. Rushmore, Marysville, Ohio

[73] Assignee: Societe d'Assistance Technique pour Produits Nestle S.A., Lausanne, Switzerland

[21] Appl. No.: 39,956

[22] Filed: May 17, 1979

[51] Int. Cl.$^3$ ............................................. C07D 473/12
[52] U.S. Cl. ..................................... 544/275; 426/428; 426/422
[58] Field of Search .................. 544/275, 274; 426/428

[56] References Cited

U.S. PATENT DOCUMENTS 4,160,042  7/1979  Farr et al. ............................. 544/274

FOREIGN PATENT DOCUMENTS 145714  7/1967  U.S.S.R. .................................... 544/275

*Primary Examiner*—Nicholas S. Rizzo
*Attorney, Agent, or Firm*—Watson, Leavenworth, Kelton & Taggart

[57] ABSTRACT

A process is disclosed wherein the decaffeination of solutions of caffeine in fatty media is effected with hydrophilic, phenol/formaldehyde polymeric resins having phenolic functional groups. In particular, the solutions are contacted with resin to effect decaffeination and the solvent medium is recovered, whereas the exhausted resin containing adherent caffeine and any non-caffeine solids may be regenerated for re-use. Other features of the invention are described in the specification.

4 Claims, No Drawings

DECAFFEINATION OF FATTY MATERIALS

BACKGROUND OF THE INVENTION

The prior art has long recognized the demand for decaffeinated beverages such as coffee and tea. Primarily, however, the previously utilized decaffeination techniques have involved the use of organic solvents such as trichloroethylene or chloroform to treat either the vegetable material itself or an aqueous extract thereof, with subsequent separation of caffeine-laden organic solvent, so as to allow further processing of the beverage.

Recently it has been found that certain fatty materials are suitable for decaffeinating vegetable materials and aqueous extracts thereof. These decaffeination techniques are fully described in British patent specification No. 1516208. For economic reasons, it is desirable to recycle the caffeine-laden fatty material, and techniques available for removing the caffeine therefrom prior to reuse include washing with water (British patent specification No. 1516208) and vaporisation (British patent specification No. 1532547).

INTRODUCTION TO THE DISCLOSURE

This invention relates to the removal of caffeine from liquid fatty media containing dissolved caffeine.

More particularly, an object of the present invention is a process in which a hydrophilic phenol/formaldehyde polymeric resin containing phenolic functional groups may be utilized for the decaffeination of caffeine solutions. Thereafter, the resin may be regenerated by removal of caffeine and reused.

DESCRIPTION OF THE INVENTION

In accordance with the present invention, a solution of caffeine in a fatty medium is contacted with a hydrophilic, phenoll formaldehyde polymeric resin containing phenolic functional groups thereby to adsorb caffeine therefrom. After an appropriate time of contact the resin is separated and usually regenerated for further use by removal of caffeine.

The caffeine solution is a solution in a fatty material such as a vegetable or animal fat or oil. Examples of such fatty materials are olive oil, corn oil, soybean oil, safflower oil, peanut oil, coffee oil and lard, as well as triolein which is a component of naturally-occurring fatty materials. These solutions are obtained in the decaffeination of vegetable materials such as tea or coffee.

Most preferred are cross-linked phenol-formaldehyde resins having phenolic hydroxyl and methylol active functional groups as these particular resins have specific absorptivity for caffeine dissolved in a fatty medium. These active functional groups confer a hydrophilic character on the resins.

Decaffeination may take place simply by contacting the caffeine solution with the resin. In most cases, this contacting is preferably effected in suitable columns, tanks or other beds holding resin particles. The feed temperature has been observed to affect decaffeination efficiency, and it is therefore preferred to operate below about 100° C. Temperatures in the range 60° to 75° C. are usually most suitable, but should be selected having regard to the behaviour of the resin. On the other hand, very low temperatures are also preferably avoided since they lead to increased viscosity of the caffeine solutions, thus adversely affecting contacting.

The feed/resin ratio, expressed for convenience on a weight/weight basis, is usually in the range 10:1 to 40:1, but in any specific application it will depend, inter alia, on the caffeine content of the feed and the degree of decaffeination desired. For example, a residual caffeine level of up to 30 ppm in the fatty material is acceptable for it is not the final decaffeinated product which reaches the consumer. In practice, therefore, a balance will be struck between the decaffeination efficiency obtainable with a low ratio and economic operational advantages to be derived from a high ratio.

Numerous apparatus systems and processing conditions for contacting resin and caffeine solution will be readily apparent to those of ordinary skill in the art. In a preferred embodiment, several beds of the resin are used in the decaffeination system. Accordingly, when the caffeine solution feed is passed to any one such bed or series of beds, other used beds can be reactivated or regenerated through the removal of adsorbed and entrained caffeine and non-caffeine constituents therefrom. In this manner, the process may be operated on a continuous basis.

The flow rate of feed and volume of resin should be adjusted so as to permit intimate contact for at least five minutes, preferably from about 20 to about 60 minutes, therebetween. Extended periods are not required for small quantities of feed and for fresh resin. However, an industrial operation would generally require several, for example, about 5 to 15, separate resin beds for efficient decaffeination.

The availability of numerous beds in a process within the scope of the present invention permits more efficient utilization of the resins. Thus, by ordering several of the beds in counter-current fashion so that the feed consecutively contacts less-exhausted resins, maximum caffeine removal is possible. When the first bed in the series is completely exhausted, it may be bypassed and regeneration thereof begun. Moreover, a regenerated bed may simultaneously be connected as the last bed in the flow scheme, thereby insuring relatively uniform, efficient and complete decaffeination.

In such a counter-current system, however, much of the resin is in a partially exhausted state and is of lower activity. Consequently, longer total contacting times may be desired for maximum decaffeination. Thus, up to about five hours of resin-feed contact is preferred.

Where different resins or resins having different degrees of exhaustion are employed, it is advantageous to utilize separate receptacles, or beds, for each. These receptacles, or beds, may then be connected for parallel, or preferably series, flow for contact with the caffeine solution.

As indicated above, the resins are permitted to remain in contact with feed until their decaffeination activity has been substantially reduced through saturation with adsorbed caffeine and possibly other solubles. The exhausted resin is then subjected to regenerative treatment, which is most conveniently effected by rinsing the resin with a non-polar solvent such as n-propanol, starting with a back-flush. A hot water rinse usually follows the propanol.

The invention is illustrated by the following Examples, in which the parts and percentages are expressed on a weight basis.

EXAMPLE 1

A hydrophilic phenol/formaldehyde polymeric resin having phenolic functional groups ("Duolite S-761") is utilized for the decaffeination of a solution of caffeine in coffee oil containing 500 ppm of caffeine. The solution, at a temperature of 71° C., is passed slowly through a bed of resin at a rate of 4 bed volumes/hour. After 4 hours analysis shows that 88% of the caffeine originally present has been removed. The resin is back-flushed with 1 to 2 bed volumes of n-propanol and washed with a total of 8 bed volumes of the same solvent.

EXAMPLE 2

Coffee oil containing 500 ppm of caffeine (obtained by contacting coffee oil, recovered from spent coffee grounds, with water-soaked green coffee beans at 85° C.) is contacted at 71° C. with a phenol/formaldehyde hydrophilic resin having phenolic functional groups. The oil/resin ratio is 10:1. After 30 minutes, the caffeine content of the oil is reduced to 33 ppm. Contact of the oil with a fresh batch of resin (10:1 ratio, 71° C.) for 30 minutes reduces the caffeine content to 3 ppm.

The procedure described in this Example may also be used for decaffeinating oil expressed from roasted and ground coffee so that it might be used as a solvent for caffeine.

EXAMPLE 3

500 ml of corn oil containing 527 ppm of caffeine are contacted at 71° C. with 50 ml of phenol/formaldehyde resin. After 120 minutes, the caffeine content of the oil is reduced to 14 ppm.

The Table summarises results obtained with different fatty materials under the same conditons.

TABLE

| Fat | PPM Caffeine In fat (start) | Ratio Fat Resin | Temp. | Contact Time | PPM Caffeine in fat (finish) |
|---|---|---|---|---|---|
| Corn oil | 527 | 10/1 | 71° C. | 2 hours | 14 |
| Peanut oil | 499 | " | " | " | 15 |
| Olive oil | 519 | " | " | " | 13 |
| Safflower oil | 487 | " | " | " | 14 |
| Soybean oil | 499 | " | " | " | 11 |
| Lard | 516 | " | " | " | 13 |
| Triolein | 578 | " | " | " | 66 |
| Coffee oil | 475 | " | " | " | 33 |
| " | " | 5/1 | 70° C. | " | 36 |
| " | " | 10/1 | " | " | 61 |
| " | " | 15/1 | " | " | 85 |
| " | " | 20/1 | " | " | 109 |
| " | " | 25/1 | " | " | 134 |
| " | " | 30/1 | " | " | 158 |
| " | " | 35/1 | " | " | 182 |
| " | " | 40/1 | " | " | 206 |
| " | " | 10/1 | 32° C. | " | 81 |
| " | " | " | 38° C. | " | 75 |
| " | " | " | 43° C. | " | 69 |
| " | " | " | 49° C. | " | 62 |
| " | " | " | 54° C. | " | 56 |
| " | " | " | 60° C. | " | 50 |
| " | " | " | 66° C. | " | 43 |
| " | " | " | 71° C. | " | 37 |
| " | " | " | 77° C. | " | 38 |
| " | " | " | 82° C. | " | 44 |
| " | " | " | 88° C. | " | 51 |
| " | " | " | 93° C. | " | 58 |

I claim:

1. A process for the removal of caffeine from a solution of caffeine in a fatty medium which comprises contacting the solution with a hydrophilic, phenol/formaldehyde polymeric resin having phenolic functional groups and separating the resin from solution having a reduced caffeine content.

2. The process of claim 1, wherein the contacting is effected at a temperature of from 60° C. to 75° C.

3. The process of claim 1 or claim 2, wherein the fatty material is olive oil, corn oil, soybean oil, safflower oil, coffee oil, peanut oil, lard or triolein.

4. The process of claim 1 or claim 2, wherein the solution of caffeine is coffee oil expressed from roasted and ground coffee.

* * * * *